(12) United States Patent
Alfano et al.

(10) Patent No.: US 9,712,377 B2
(45) Date of Patent: Jul. 18, 2017

(54) METHODS AND APPARATUS TO TRANSFER MANAGEMENT CONTROL OF A CLIENT BETWEEN SERVERS

(71) Applicant: BlackBerry Limited, Waterloo (CA)

(72) Inventors: Nicholas Patrick Alfano, Stratford-Upon-Avon (GB); Douglas Michael Gisby, Highland, IL (US); Axel Ferrazzini, Uccle (BE); Jason Lee Carter, Davie, FL (US); John Francis Holmes, Plantation, FL (US); Thomas Owen Parry, Cambridge (CA); Richard Enrique Lopez, Miami, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 558 days.

(21) Appl. No.: 13/629,092

(22) Filed: Sep. 27, 2012

(65) Prior Publication Data

US 2013/0031608 A1    Jan. 31, 2013

Related U.S. Application Data

(63) Continuation of application No. PCT/US2011/029822, filed on Mar. 24, 2011.

(Continued)

(51) Int. Cl.
*H04L 29/06* (2006.01)
*H04L 12/24* (2006.01)
(Continued)

(52) U.S. Cl.
CPC ............. *H04L 41/042* (2013.01); *H04W 4/00* (2013.01); *H04W 4/001* (2013.01);
(Continued)

(58) Field of Classification Search
CPC .... G06F 21/32; G06F 21/10; G06F 17/30864; G06F 21/6218; H04L 9/3281; H04L 63/08
USPC ................. 707/64, 705; 709/203; 726/2, 28; 380/232
See application file for complete search history.

(56) References Cited

U.S. PATENT DOCUMENTS 8,739,258 B2 * 5/2014 Alnas et al. ...................... 726/7
2004/0162870 A1 * 8/2004 Matsuzaki et al. ........... 709/200
(Continued)

FOREIGN PATENT DOCUMENTS

WO     2005/121989     12/2005

OTHER PUBLICATIONS

Patent Cooperation Treaty, "International Search Report," issued by the International Searching Authority in connection with PCT application No. PCT/US2011/029822, mailed Jun. 20, 2011, (3 pages).

(Continued)

*Primary Examiner* — Joseph P Hirl
*Assistant Examiner* — Leynna Truvan
(74) *Attorney, Agent, or Firm* — Fish & Richardson P.C.

(57) ABSTRACT

An example network device includes a processor configured to execute an Open Mobile Alliance (OMA) Device Management (DM) server, the OMA DM server to perform operations of: participating in mutual authentication with a second OMA DM server; sending a notification to the second OMA DM server for notifying the second OMA DM server to proceed with a delegation process; and sending, to a DM client, information for modifying an access control list (ACL).

15 Claims, 8 Drawing Sheets

Related U.S. Application Data

(60) Provisional application No. 61/320,125, filed on Apr. 1, 2010.

(51) Int. Cl.
*H04W 4/00* (2009.01)
*H04W 12/06* (2009.01)
*H04W 12/08* (2009.01)

(52) U.S. Cl.
CPC .......... *H04L 63/101* (2013.01); *H04W 12/06* (2013.01); *H04W 12/08* (2013.01)

(56) References Cited

U.S. PATENT DOCUMENTS

| | | | |
|---|---|---|---|
| 2008/0046758 A1* | 2/2008 | Cha | G06F 21/57 713/189 |
| 2008/0160983 A1 | 7/2008 | Poplett et al. | |
| 2010/0077451 A1* | 3/2010 | Fujimoto et al. | 726/3 |
| 2011/0314293 A1* | 12/2011 | Yu | H04L 41/0233 713/179 |

OTHER PUBLICATIONS

Patent Cooperation Treaty, "Written Opinion of the International Searching Authority," issued by the International Searching Authority in connection with PCT/US2011/029822, mailed Jun. 20, 2011, (6 pages).

Patent Cooperation Treaty, "International Preliminary Report on Patentability," issued by the International Searching Authority in connection with PCT/US2011/029822, mailed Oct. 2, 2012, (6 pages).

Wikipedia, "Access Point Name," retrieved from http://en.wikipedia.org/wiki/Access_Point_Name on Mar. 28, 2010 (2 pages).

Open Mobile Alliance, "Enabler Release Definition for OMA Device Management," Approved Version 1.2.1, Jun. 17, 2008 (14 pages).

Open Mobile Alliance, "Device Management Requirements," Approved Version 1.2, Feb. 9, 2007 (62 pages).

Open Mobile Alliance, "SyncML Device Management Tree and Description," Version 1.1.2, Approved Version, Dec. 2, 2003 (44 pages).

Open Mobile Alliance, "OMA Device Management Bootstrap," Approved Version 1.2.1, Jun. 17, 2008 (28 pages).

Open Mobile Alliance, "OMA Device Management Protocol," Draft Version1.3, Mar. 15, 2010 (54 pages).

Open Mobile Alliance, "OMA Device Management Standardized Objects," Approved Version 1.2, Feb. 9, 2007 (29 pages).

Open Mobile Alliance, "OMA Device Management Standardized Objects," Draft Version 1.3, Feb. 11, 2010 (32 pages).

Open Mobile Alliance, "OMA Device Management Bootstrap," Candidate Version 1.2, Dec. 16, 2005 (27 pages).

Communication Pursuant to Article 94(3) EPC issued by the European Patent Office in Application No. 11713557.4, dated Jun. 17, 2016.

* cited by examiner

METHODS AND APPARATUS TO TRANSFER MANAGEMENT CONTROL OF A CLIENT BETWEEN SERVERS

FIELD OF THE DISCLOSURE

The present disclosure relates generally to network communications and, more particularly, to methods and apparatus to transfer management control of a client between servers.

BACKGROUND

Mobile communications enable devices and/or users to communicate with one another through one or more wireless communication protocols using one or more services. In some mobile communication systems, mobile device services or operations are managed by service providers. For example, a service provider can provision client mobile devices for device management by one or more management servers of that service provider. The Open Mobile Alliance (OMA) group develops and defines guidelines or standards for implementing such server-client management relationships.

DETAILED DESCRIPTION

Figure 1:
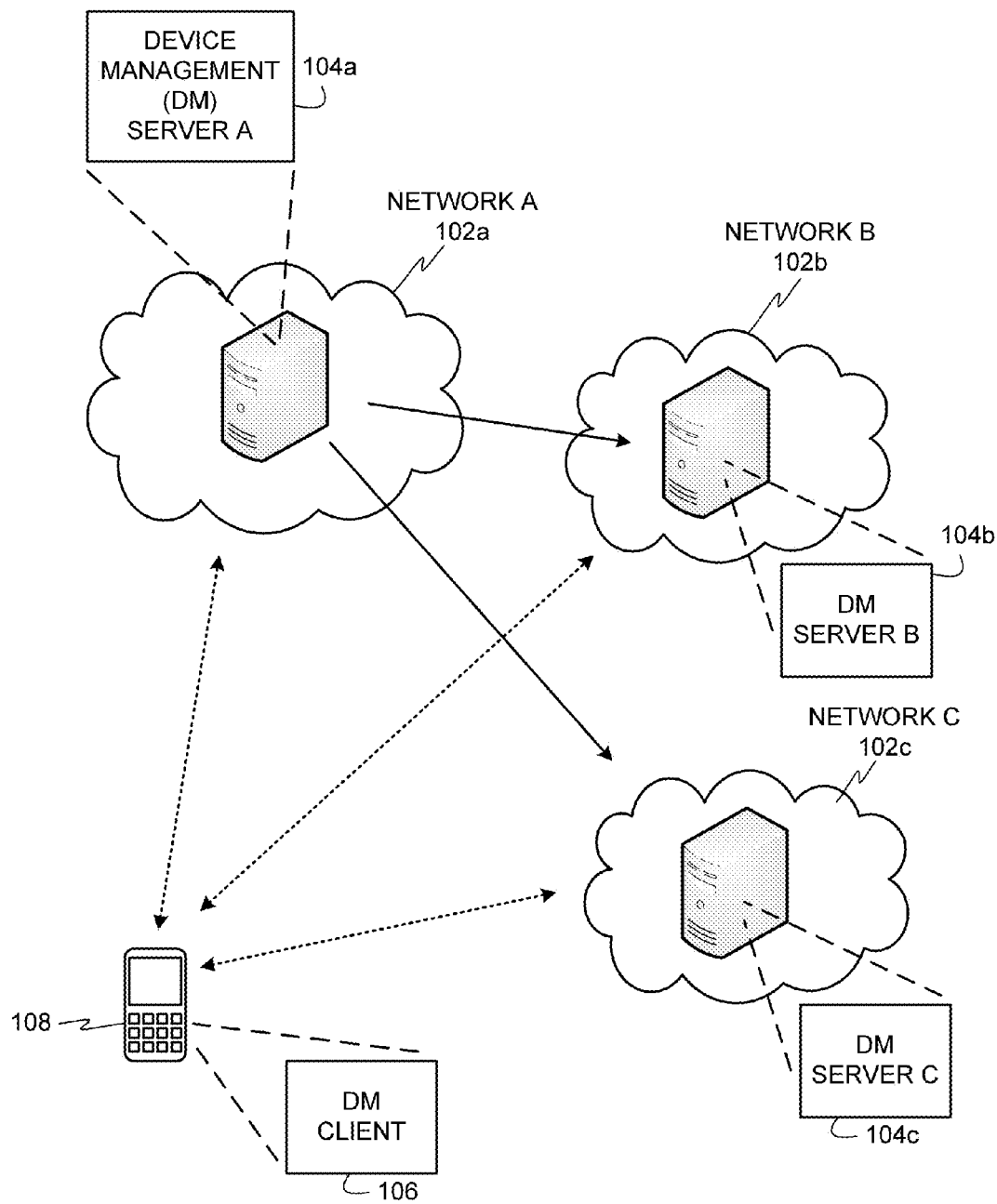
FIG. 1 depicts example mobile communication networks with device management servers that can implement device management control over a device management client in a mobile device.

Although the present application discloses example methods and apparatus including, among other components, software executed on hardware, it should be noted that such methods and apparatus are merely illustrative and should not be considered as limiting. For example, any or all of these hardware and software components could be embodied exclusively in hardware, exclusively in software, exclusively in firmware, or in any combination of hardware, software, and/or firmware. Accordingly, while example methods and apparatus are described herein, persons having ordinary skill in the art will readily appreciate that the examples provided are not the only ways to implement such methods and apparatus.

The example methods and apparatus described herein can be used to transfer device management (DM) control (or management) of a DM client between DM servers. That is, according to the example methods and apparatus, a DM server is configured to delegate the management of a DM client to another DM server. The example methods and apparatus described herein can be used in connection with mobile communication devices, mobile computing devices, or any other device capable of accessing information over a mobile communications network. Such devices, also referred to as user equipment (UE), clients, or terminals, may include mobile smart phones (e.g., a BlackBerry® smart phone), personal digital assistants (PDA), laptop/notebook/netbook/tablet computers, desktop computers, etc.

The example methods and apparatus described herein can be implemented in connection with the Open Mobile Alliance (OMA) specifications related to device management (DM) processes, which, among other things, specify protocols and mechanisms to manage mobile devices including specifying configurations to access services and management of software on mobile devices. The example methods and apparatus may additionally or alternatively be implemented in connection with other specifications, methods, or techniques to manage services and software on mobile devices.

The example methods and apparatus described herein enable a DM server to pass DM control (i.e., management) of a DM client (full or partial control, temporarily or permanently) to one or more other DM servers when two or more DM servers are available to manage a single DM client. Such transfer of DM control is implemented using a delegation process described herein to pass or transfer full or partial control (which may be permanent or temporary) over a DM client from one DM server to one or more other DM servers. In this manner, management of a DM client can be delegated between DM servers when, for example, the DM client is geographically moved between areas covered or managed by different DM servers. For example, a mobile device (e.g., having a DM client) homed in Europe can be registered for management by a European DM server of a mobile communications service provider. When the mobile device is moved to another country (e.g., Canada), management of the mobile device can be delegated by the European DM server to a Canadian (or North American) DM server so that access to services and software associated with that mobile device can be managed by the Canadian (or North American) DM server while the mobile device is in Canada.

Such delegation of control can be used to significantly reduce the communications overhead required between a home DM server (e.g., the European DM server in the above example) and a roaming DM server (e.g., the Canadian DM server in the above example) when, for example, a mobile device (having a DM client) is moved to areas managed by other DM servers. That is, in traditional device management systems, a roaming DM server communicates with a home DM server to ensure that management of a roaming mobile device is in accordance with policies enforced by the home DM server. In addition, the example methods and apparatus described herein can be used when a mobile device is permanently moved to a different area managed by a respective DM server so that a previous controlling DM server can permanently release control over the mobile device to the DM server of the new location.

The techniques described herein for delegating DM control between different DM servers involve signaling information or notification exchanges between a DM server delegator, a DM server delegatee, and a DM client. In particular, a DM server delegator is the DM server that is implementing DM control over or currently managing a DM client prior to transferring or delegating that control to the DM server delegatee. In the example implementations described herein, such transfer or delegation of management of the DM client can be initiated by the DM server delegatee or by the DM server delegator. During the delegation process, access control information and device management account information associated with the subject DM client can be updated or created to establish permissions regarding how DM control over the DM client is to be implemented. In addition, the delegation process can be of a particular scope or type, such as, full or partial control, for a temporary or permanent duration. To ensure that the delegation is secure, a temporary delegation key can be generated and shared between the DM server delegator, the DM server delegatee, and the DM client. Such a security key can be used to prevent accidental or intentional hijacking of DM control over a DM client by, for example, a third party or any other entity.

Turning to FIG. 1, example mobile communication networks A 102a, B 102b, and C 102c (e.g., cellular or other wireless networks) include or are associated with respective DM servers A 104a, B 104b, and C 104c that can implement DM control over (i.e., manage) a DM client 106 of a mobile device 108. In the illustrated example, the DM client 106 is a software component in the mobile device 108 (e.g., a managed device) that interprets commands, executes appropriate actions in the mobile device 108 and sends back relevant responses to an issuing management server (e.g., one of the DM servers 104a, 104b, and 104c). Also in the illustrated example, a DM server is a software component, which is configured to execute on a network device such as a server computer, that issues management commands to DM clients. In some example implementations, each of the DM servers 104a-c manages devices in a respective geographic area (e.g., in a respective country, territory, state, etc.) or for a respective network operator (e.g., entities that operate/manage or are otherwise associated with networks A, B, and C 102a-c). Additionally or alternatively, other partitioning or distribution of control responsibilities among the DM servers 104a-c can be used.

Figure 4:
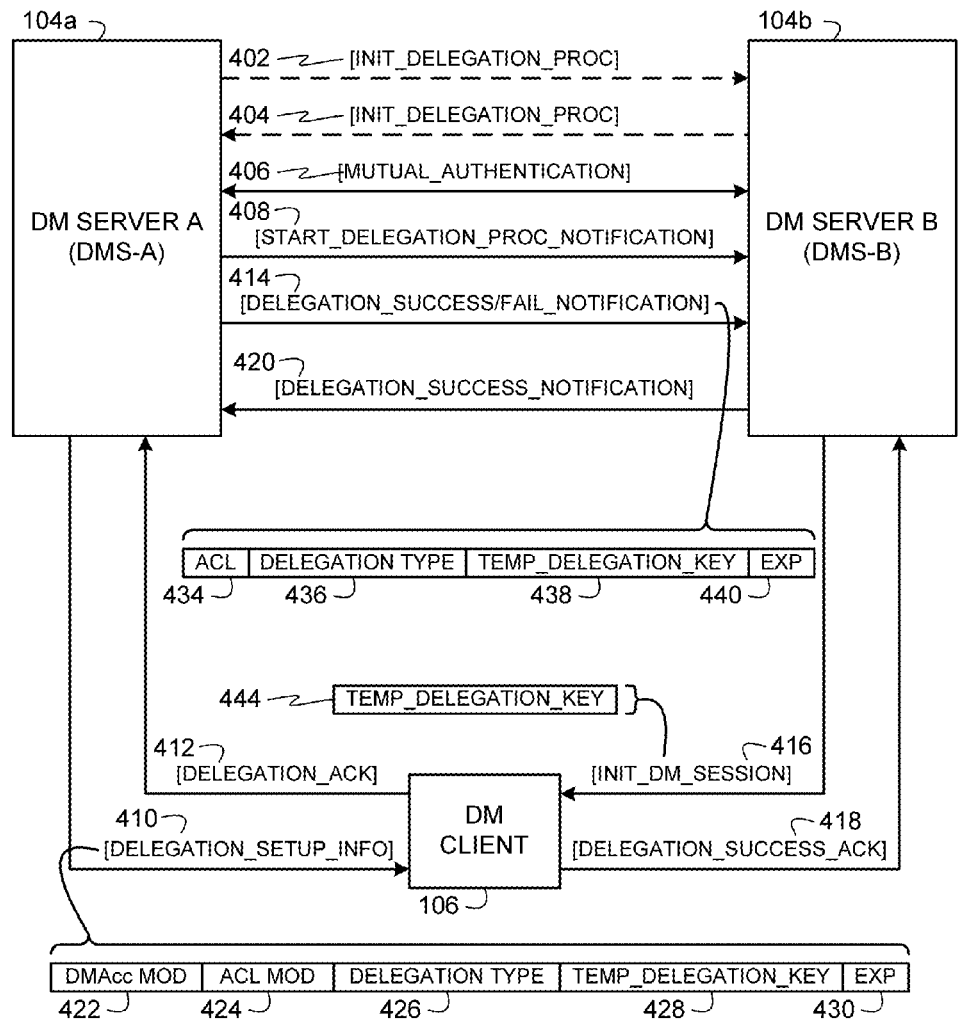
FIG. 4 depicts example signaling exchanges between the device management servers and a device management client of FIGS. 1 and 2 to implement a delegation process to delegate control over the device management client from one device management server to another device management server.

When the DM server A 104a is implementing DM control over the mobile device 108 to manage the device, and the mobile device 108 is moved to another geographic location managed by the DM server B 104b or the DM server C 104c, a delegation process is initiated in which the DM server A 104a operates as the DM server delegator and the DM server B 104b or the DM server C 104c operates as the DM server delegatee to receive management over the DM client 106. In some example implementations, a DM server delegator can transfer control over or management of a DM client to two or more DM server delegatees. For example, the DM server A 104a can delegate management of the DM client 106 to the DM server B 104b and the DM server C 104c, such that the DM servers 104b-c can share control over the DM client 106. In such an example, each of the DM servers 104b-c can receive partial control capabilities delegated by the DM server A 104a such that the combination of the DM servers 104b-c form full control over the DM client 106. Example signaling exchanges between DM servers and a DM client are depicted in FIG. 4. In addition, FIGS. 5A, 5B, 6, and 7 depict example processes that can be used to exchange and process the information depicted in FIG. 4 to transfer management between DM servers.

Figures 2, 3:
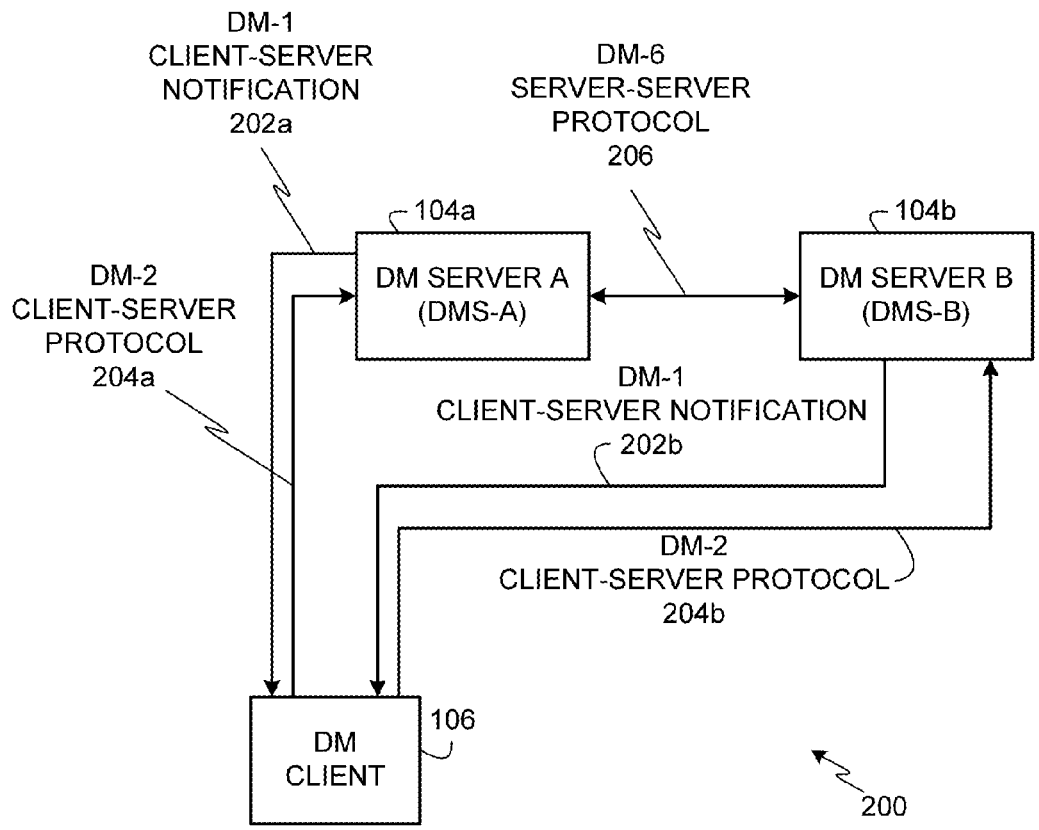
FIG. 2 is an example communication architecture between two device management servers and a device management client showing different notification and protocol interfaces that can be used to implement the delegation processes of FIGS. 4, 5A, 5B, 6, and 7.
FIG. 3 is an example delegation type data structure that references several delegation types that can be used to specify the scope and type of device management control that can be delegated between device management servers.

Turning to FIG. 2, an example communication architecture 200 between the DM server A 104a, the DM server B 104b, and the DM client 106 is shown in connection with different notification and protocol interfaces that can be used to implement the delegation processes of FIGS. 4, 5A, 5B, 6, and 7. In the illustrative example of FIG. 2, the DM server A 104a is the delegator or delegating server and the DM server B 104b is the delegatee server. As shown, the DM servers A 104a and B 104b communicate with the DM client 106 using DM-1 client-server notification interfaces 202a-b, and the DM client 106 communicates with the DM server A 104a and the DM server B 104b using DM-2 client-server protocol interfaces 204a-b.

In the illustrated example of FIG. 2, the DM-1 client-server notification interfaces 202a-b are bearer neutral and can operate over different protocols such as wireless application protocol (WAP) push, short message service (SMS), HTTP, and session initiation protocol (SIP) push. The DM servers 104a-b can use the DM-1 client-server notification interfaces 202a-b to send device management notifications to DM clients.

In the illustrated example of FIG. 2, the DM-2 client-server protocol interfaces 204a-b can be used by the DM servers 104a-b to send device management commands to the DM client 106 and can be used by the DM client 106 to return status and alerts to the DM servers 104a-b. The DM-2 client-server protocol interfaces 204a-b are bearer neutral and provide standardized bindings including hypertext transfer protocol (HTTP) and secure HTTP (HTTPS). The DM-2 client-server protocol interfaces 204a-b may be exposed over an airlink-based data bearer protocol (e.g., general packet radio service (GPRS)) to provide over-the-air device management capability.

Example requirements and capabilities of the DM-1 client-server notification interfaces 202a-b and the DM-2 client-server protocol interfaces 204a-b can be found in the OMA specifications related to device management processes. However, changes in the information exchanged via the DM-1 client-server notification interfaces 202a-b and the DM-2 client-server protocol interfaces 204a-b, as discussed below in connection with FIG. 4, enable implementing delegation processes to transfer or delegate management between different DM servers using the example methods and apparatus described herein.

Also shown in FIG. 2 is a DM-6 server-server protocol interface 206 used to exchange management commands and responses between the DM server A 104a and the DM server B 104b to, for example delegate or transfer DM control. The DM-6 server-server protocol interface 206 is bearer neutral and provides standardized bindings including HTTP and HTTPS. Preferably, but not necessarily, HTTPS can be used for security reasons. Signaling and information exchanged between the DM servers 104a-b via the DM-6 server-server protocol 206 are described below in connection with FIGS. 4, 5A, 5B, 6, and 7.

Turning briefly to FIG. 3, an example delegation type data structure 300 references several delegation types that can be used to specify the scope and type of DM control that is delegated between DM servers (e.g., the DM servers 104a-c of FIG. 1). In the illustrated example, each of the delegation types is an enumerated type. Although only unrestricted (e.g., full control), restricted (e.g., partial control), permanent, and temporary delegation types are shown, the delegation types can be extended and further enumerated to specify additional delegation types. One or more of the delegation types may be used to delegate a type of management to another DM server. For example, the DM server A 104a may delegate an unrestricted and permanent type of management for a mobile device (e.g., the mobile device 108) that is permanently being relocated to another geographic location. In some example implementations, the delegation types shown in the delegation type data structure 300 can be stored in DM account management objects (DMAcc MOs) and/or associated access control lists (ACLs) (described below) based on the types of management responsibilities being delegated.

FIG. 4 depicts example signaling exchanges between the DM server A 104a, the DM server B 104b, and the DM client 106 of FIGS. 1 and 2 to implement a process to delegate management of the DM client 106 from the DM server A 104a to the DM server B 104b. In the illustrative example of FIG. 4, the DM server A 104a operates as the DM server delegator and the DM server B 104b operates as the DM server delegatee to receive management responsibility from the DM server A 104a to manage the DM client 106. The DM servers 104a-b use the DM client 106, a DM management tree object, a DM account management object (DMAcc MO), and associated access control lists (ACLs) to transfer control over the DM client 106 from the DM server A 104a to the DM server B 104b.

The structures and syntaxes of DM management tree objects, DMAcc MOs, and ACLs are specified in the OMA specifications related to device management processes. In example implementations associated with OMA DM, each device (e.g., the mobile device 108 of FIG. 1) that supports OMA DM contains or stores a management tree for a DM client of the device. The management tree organizes the available management objects (MOs) in the device as nodes in a hierarchical tree structure where each of the nodes can be uniquely addressed with a universal resource identifier (URI). Each node can be manipulated (or nodes can be added or removed) by a DM server (e.g., one of the DM servers 104a-c of FIG. 1) using management actions carried over an OMA DM protocol (e.g., the DM-1 client-server protocol interface 202a-b of FIG. 2). During runtime, a DM server can explore a management tree of a DM client using a GET command and extend or otherwise modify the management tree using ADD or REPLACE commands. In addition, a DM client can extend its management tree based on user input or in response to attachment of an accessory (e.g., a removable memory, an I/O add-on, etc.) to the device.

Devices compliant with OMA DM (e.g., the mobile device 108 of FIG. 1) support DMAcc MOs to store settings for communications via a DM protocol (e.g., the DM-2 client-server protocol interfaces 204a-b of FIG. 2) with or by the DM client (e.g., the DM client 106). Such settings include login credentials that the DM client uses to authorize access by DM servers. In the illustrated examples described herein, when a DM server delegator (e.g., the DM server A 104a) transfers or delegates management of a DM client (e.g., the DM client 106) to one or more DM server delegatees (e.g., the DM server B 104b), the DM server delegator creates a new DMAcc in the DM client to allow the DM server delegatee(s) to establish a DM control session with the DM client.

Devices compliant with OMA DM (e.g., the mobile device 108 of FIG. 1) also support ACLs. An ACL is a node property of a DM management tree object and is used to grant access rights to server identifiers of DM servers (e.g., the DM servers 104a-c of FIG. 1) to access a DM client (e.g., the DM client 106 of FIG. 1) or a specific node or nodes of the DM tree associated with a DM client. An ACL can grant access permissions to DM servers on a per-command basis. For example, to allow a particular command (e.g., open a DM control session) to be issued by the DM server B 104b to the DM client 106, an ACL of the DM client 106 associates the server identifier of the DM server B 104b to the particular command. Without the server identifier of the DM server B 104b being associated or assigned to the command, the DM server B 104b is not authorized to issue the command to the DM client 106. During the delegation process of FIG. 4, the DM server A 104a can transfer or delegate management of the DM client 106 by modifying the ACL of the DM client 106. In this manner, the DM server B 104b is allowed to establish a DM control session with the DM client 106 to complete the transfer of DM control to the DM server B 104b.

For example implementations in which DM control over a DM client is transferred to multiple DM servers, the ACLs of the DM client can be updated to indicate a hierarchical control structure for the multiple DM servers to indicate the ordering of control priority (e.g., primary priority, secondary priority, tertiary priority, etc.) allocated to each of the DM servers. In addition, the ACLs of the DM client may be updated to indicate a default DM server. The priority and default information can be used by the DM client to communicate information to a DM server when it has multiple DM servers to choose from. In this manner, the DM client need not communicate the same information to more than one DM server to ensure that all of the DM servers are synchronized. Instead, the information communicated by the DM client to one of the DM servers can be synchronized to the other DM servers without involvement by the DM client for such synchronization.

In the illustrated example of FIG. 4, the depicted messages or signaling exchanges are communicated between the DM server A 104a, the DM server B104b, and/or the DM client 106 via respective ones of the DM-1 client-server notification interfaces 202a-b, the DM-2 client-server protocol interfaces 204a-b, and the DM-6 server-server protocol interface 206 of FIG. 2. In particular, the DM servers 104a-b use the DM-6 server-server protocol interface 206 (FIG. 2) to communicate between each other initialize delegation process signalings [INIT_DELEGATION_PROC] 402 and 404, a mutual authentication exchange [MUTUAL_AUTHENTICATION] 406, a start delegation process notification [START_DELEGATION_PROC_NOTIFICATION] 408, a delegation success/fail notification [DELEGATION_SUCCESS/FAIL_NOTIFICATION] 414, and a delegation success notification [DELEGATION_SUCCESS_NOTIFICATION] 420.

The DM server A 104a communicates delegation setup information [DELEGATION_SETUP_INFO] 410 to the DM client 106 via the DM-1 client-server notification interface 202a (FIG. 2), and the DM client 106 communicates a delegation acknowledgement [DELEGATION_ACK] 412 to the DM server A 104a via the DM-2 client-server protocol interface 204a (FIG. 2). The DM server B 104a communicates an initialize DM session signaling [INIT_DM_SES- SION] 416 to the DM client 106 via the DM-1 client-server notification interface 204*b* (FIG. 2), and the DM client 106 communicates a delegation success acknowledgement [DELEGATION_SUCCESS_ACK] 418 to the DM server B 104*b* via the DM-2 client-server protocol interface 204*b* (FIG. 2). As known in the art, one or both of signaling messages 416 and 418 relate to an operation referred to in OMA DM as "bootstrapping" the DM client 106.

The use of the messages or signaling exchanges depicted in the delegation process of FIG. 4 are described in more detail below in connection with the description of the example process of FIG. 5. In brief, the DM servers 104*a*-*b* connect and exchange information indicating that the DM server A 104*a* intends to transfer DM management control over the DM client 106 to the DM server B 104*b*. The delegation process can be initiated by the DM server delegator (e.g., the DM server A 104*a* in the illustrated example) as shown by the initialize delegation process (INIT_DELEGATION_PROC) signaling 402 communicated by the DM server A 104*a* to the DM server B 104*b*, or the delegation process can be initiated by the DM server delegatee (e.g., the DM server B 104*b* in the illustrated example) as shown by the initialize delegation process (INIT_DELEGATION_PROC) signaling 404 communicated by the DM server B 104*b* to the DM server A 104*a*. In either case, the sending of the initialize delegation process signaling 402 or 404 can be triggered upon detection that the DM client 106 has registered or is attempting to register with the DM server B 104*b*. For example, the DM client 106 may be associated with a mobile subscriber plan having a roaming feature (e.g., international roaming, national roaming, or any other regional roaming feature) such that the DM client 106 is allowed to register with and operate while in communication with DM servers outside of its home area.

The DM server A 104*a* communicates message 410 to the DM client 106 and uses a DMAcc mod field 422 to create a new DM account management object (DMAcc MO) in the DM client 106 for the DM server B 104*b* if one does not exist. In the illustrated example, the DM server A 104*a* uses the DMAcc mod field 422 to populate the DMAcc MO with credentials that allow the DM server B 104*b* to establish a DM control session with the DM client 106. In addition, the DM server A 104*a* may use an ACL mod field 424 to add the server identifier of the DM server B 104*b* to ACLs of the DM client 106 for which the DM server A 104*a* would like to transfer management control to the DM server B 104*b*. The DM server A 104*a* also sends one or more delegation type identifiers (e.g., one or more of the delegation type identifiers of the delegation type data structure 300 of FIG. 3) via a delegation type field 426 to the DM client 106 to inform the DM client 106 of the scope and type of management that is being delegated to the DM server B 104*b*.

To ensure a secure transfer of control to the DM server B 104*b*, the DM server A 104*a* generates and sends a temporary delegation key (TEMP_DELEGATION_KEY) in a TEMP_DELEGATION_KEY field 428 to the DM client 106 along with an expiration value in an expiration field 430. The temporary delegation key is a unique key known only to the DM server A 104*a*, the DM server B 104*b*, and the DM client 106. The temporary delegation key may be time limited using the expiration value of the expiration field 430 to add further security and authentication to the delegation process. The expiration value may be a time-date stamp or any other value (e.g., a counter value, a timer value, etc.) indicative of when the temporary delegation key is no longer valid for use by the DM server B 104*b* for connecting to the DM client 106.

In some example implementations, to enable the DM client 106 to connect with the DM server B 104*b*, the DM server A 104*a* may also communicate network information or parameters to the DM client 106 for use by the DM client 106 for connecting with the DM server B 104*b*. Such network information can be communicated in the DMAcc mod field 422 or a separate field (e.g., a network field) (not shown) of the delegation setup information message [DELEGATION_SETUP_INFO] 410 and can include, for example, an access point name (APN) and/or other type of network information to enable the DM client 106 to connect to the DM server B 104*b*. The network information may be stored in a 'ToConRef' branch and/or a 'PreConRef' node of a DMAcc MO.

The DM server A 104*a* notifies the DM server B 104*b* that it has made the DM client 106 ready so that the DM server B 104*b* may connect to it and establish partial or full control over the DM client 106. In the illustrated example, the DM server A 104*a* sends the DM server B 104*b* ACL information in an ACL field 434 indicative of the access control permissions assigned to the DM server B 104*b* in the DM client 106. The DM server A 104*a* also sends the DM server B 104*b* the one or more delegation type identifiers in a delegation type field 436 that were also sent to the DM client 106 in the delegation type field 410. The DM server A 104*a* also sends the DM server B 104*b* the temporary delegation key shared with the DM client 106 and the expiration value for the key in a TEMP_DELEGATION_KEY field 438 and an expiration field 440.

In response, the DM server B 104*b* connects to the DM client 106 forwarding the temporary delegation key in a TEMP_DELEGATION_KEY field 444, verifies it has control over some or all of the DM client 106, and begins management of the DM client 106. The DM server B 104*b* may communicate to the DM server A 104*a* that it has successfully completed the control allocation mechanism to establish management over the DM client 106.

FIGS. 5A, 5B, 6, and 7 depict example flow diagrams representative of processes that may be implemented using, for example, computer readable instructions that may be used to transfer or delegate management of a DM client from one DM server to one or more other DM servers. The example processes of FIGS. 5A, 5B, 6, and 7 may be performed using a processor, a controller and/or any other suitable processing device. For example, the example processes of FIGS. 5A, 5B, 6, and 7 may be implemented using coded instructions (e.g., computer readable instructions) stored on a tangible computer readable medium known in the art such as optical or magnetic media, a flash memory, a read-only memory (ROM), and/or a random-access memory (RAM) or any other storage media (e.g., optical, magnetic, solid state, etc.) in which information is stored for any duration (e.g., for extended time periods, permanently, brief instances, for temporarily buffering, and/or for caching of the information). As used herein, the term tangible computer readable medium is expressly defined to include any type of computer readable storage medium and to exclude propagating signals.

Additionally or alternatively, the example processes of FIGS. 5A, 5B, 6, and 7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 5A, 5B, 6, and 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 5A, 5B, 6, and 7 may be implemented manually or as any combination(s) of any of the foregoing techniques, for example, any combination of firmware, software, discrete logic and/or hardware. Further, although the example processes of FIGS. 5A, 5B, 6, and 7 are described with reference to the flow diagrams of FIGS. 5A, 5B, 6, and 7, other methods of implementing the processes of FIGS. 5A, 5B, 6, and 7 may be employed. For example, the order of execution of the blocks may be changed, and/or some of the blocks described may be changed, eliminated, sub-divided, or combined. Additionally, any or all of the example processes of FIGS. 5A, 5B, 6, and 7 may be performed sequentially and/or in parallel by, for example, separate processing threads, processors, devices, discrete logic, circuits, etc.

Figure 5A:
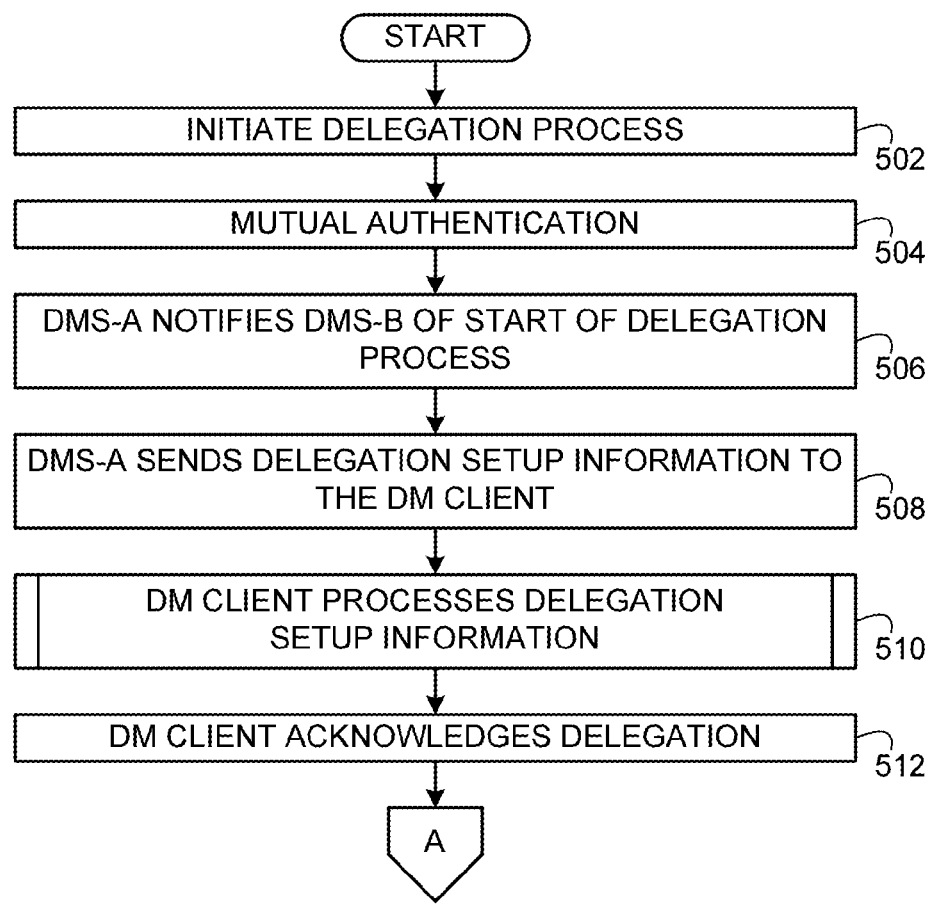
FIGS. 5A and 5B depict a flow diagram representative of an example process that may be implemented using computer readable instructions to implement a delegation process to delegate management of a device management client between device management servers.
Figure 5B:
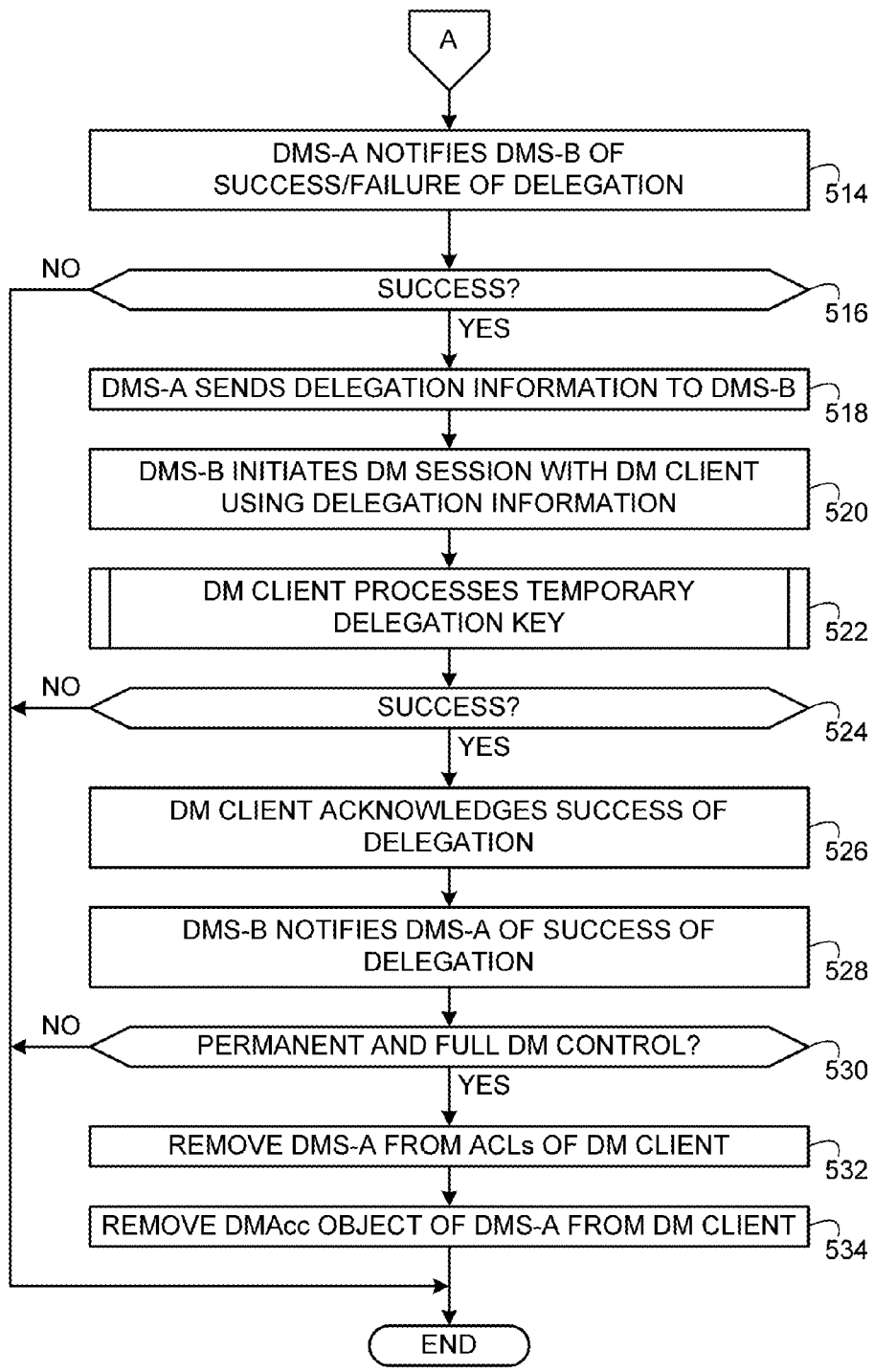

Turning in detail to FIGS. 5A and 5B, the example flow diagram depicts an example delegation process that can be used to delegate management of the DM client 106 from the DM server A 104a to the DM server 104b as shown in FIG. 4. Initially, a DM server initiates a delegation process (block 502) (FIG. 5A). For example, as shown in FIG. 4, the delegation process can be initiated by the DM server A 104a (e.g., a DM server delegator) by sending the initialize delegation process (INIT_DELEGATION_PROC) signaling 402 to the DM server B 104b (e.g., a DM server delegatee). Alternatively, the delegation process can be initiated by the DM server B 104b (e.g., a DM server delegatee) by sending the initialize delegation process (INIT_DELEGATION_ PROC) signaling 404 to the DM server A 104a (e.g., a DM server delegator). The INIT_DELEGATION_PROC signaling 402 or 404 includes a request, by the initiating server, for delegation information (e.g., delegation type, temporary delegation key, ACL permissions, etc.).

The DM servers 104a-b participate in a mutual authentication process (block 504) using, for example, the mutual authentication exchange [MUTUAL_AUTHENTICATION] 406 of FIG. 4. The mutual authentication process can be implemented using an agreed upon authentication method to confirm the identities of the DM servers 104a-b before proceeding with the delegation process. The DM server A 104a notifies the DM server B 104b of the start of the delegation process (block 506) using, for example, the start delegation process notification [START_DELEGATION_ PROCESS_NOTIFICATION] 408 of FIG. 4.

The DM server A 104a sends the delegation setup information 410 (FIG. 4) to the DM client 106 (block 508). As shown in FIG. 4, the delegation setup information [DELEGATION_SETUP_INFO] 410 includes information in the DMAcc mod field 422, the ACL mod field 424, the delegation type field 426, the temporary delegation key field 428, and the expiration field 430 discussed above in connection with FIG. 4. As shown in FIG. 5, the DM client 106 processes the delegation setup information 410 (block 510). An example process that may be used to implement block 510 is discussed below in connection with FIG. 6.

After processing the delegation setup information 410 at block 510, the DM client 106 acknowledges the delegation (block 512) by, for example, communicating the delegation acknowledgement [DELEGATION_ACK] 412 of FIG. 4 to the DM server A 104a. In the illustrated example, the delegation acknowledgement 412 can be a success acknowledgment or a failure acknowledgment to notify the DM server A 104a whether the DM client 106 has successfully implemented the changes instructed by the DM server A 104a via the delegation setup information [DELEGATION_SETUP_INFO] 410 of block 508 in preparation for transferring management of the DM client 106 to the DM server B 104b.

The DM server A 104a then notifies the DM server B 104b of the success or failure of the delegation process (block 514) (FIG. 5B) using, for example, the delegation success/fail notification [DELEGATION_SUCCESS/FAIL_ NOTIFICATION] 414 of FIG. 4. If the delegation success/ fail notification 414 is indicative of a success (block 516), the DM server A 104a also sends the delegation information discussed above in connection with FIG. 4 in the ACL field 434, the delegation type field 436, the TEMP_DELEGATION_KEY field 438, and the expiration field 440 to the DM server B 104b (block 518).

The DM server B 104b initiates a DM session with the DM client 106 using the delegation information (block 520) by, for example, communicating the initialize DM session signaling [INIT_DM_SESSION] 416 of FIG. 4 to the DM client 106. In particular, the DM server B 104b uses the ACL information to identify permissions in the new DMAcc MO of the DM client 106 allotted to the DM server B 104b. In addition, the DM server B 104b forwards the temporary delegation key in the TEMP_DELEGATION_KEY field 444 of FIG. 4 of the initialize DM session signaling [INIT_DM_SESSION] 416.

The DM client 106 processes the temporary delegation key (block 522) to confirm that the DM server B 104b is authorized to establish DM control over the DM client 106. An example process that can be used to implement block 522 is discussed below in connection with FIG. 7. When the DM client 106 successfully confirms that the DM server B 104b is authorized to assume management of the DM client 106 (block 524), the DM client 106 acknowledges a success of the delegation (block 526) by, for example, sending the delegation success acknowledgement [DELEGATION_ SUCCESS_ACK] 418 of FIG. 4 to the DM server B 104b. The DM server B 104b then notifies the DM server A 104a of the success of the delegation (block 528) by, for example, sending the delegation success notification [DELEGATION_SUCCESS_NOTIFICATION] 420 to the DM server A 104a. In some example implementations, if the delegation of management to the DM server B 104b is a permanent and full control delegation (block 530), the DM server B 104b can remove the DM server A 104a from the ACLs of the DM client 106 (block 532) and remove the DMAcc MO corresponding to the DM server A 104a from the DM client 106 (block 534). In this manner, only the DM server B 104b would have complete management of the DM client 106.

After the DM server B 104b removes the DMAcc MO corresponding to the DM server A 104a from the DM client 106 (block 534) or if the transferred DM control is not permanent and full control (block 530) or if the verification of the temporary delegation key was not successful (block 524) or if the delegation success/fail notification 414 from the DM server A 104a to the DM server B 104b is not indicative of a success (block 516), the example process of FIGS. 5A and 5B ends.

Figure 6:
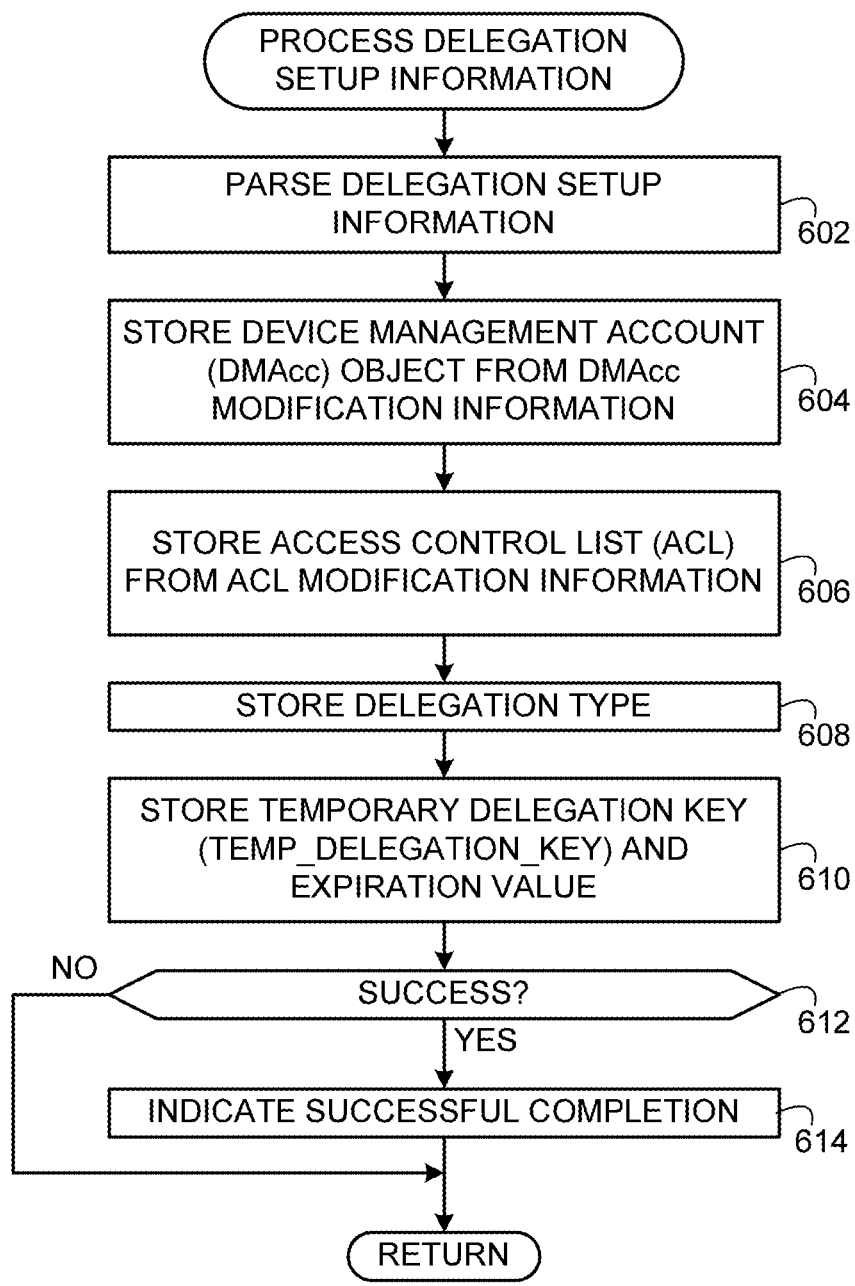
FIG. 6 depicts a flow diagram representative of an example process that may be implemented using computer readable instructions to process delegation setup information by a device management client.

FIG. 6 depicts a flow diagram representative of an example process that may be used to process delegation setup information by the DM client 106 of FIGS. 1, 2, and 4. The example process of FIG. 6 may be used to implement block 510 of FIG. 5A to process delegation setup information (e.g., the delegation setup information [DELEGATION_SETUP_INFO] 410 of FIG. 4) at the DM client 106.

Initially, the DM client 106 parses the delegation setup information 410 (block 602) by, for example, identifying the respective information in the DMAcc mod field 422, the ACL mod field 424, the delegation type field 426, the temporary delegation key field 428, and the expiration field 430 shown in FIG. 4. The DM client 106 stores a DMAcc MO from the DMAcc mod field 422 (block 604) to enable the DM server B 104*b* to establish a DM control session with the DM client 106. In addition, the DM client 106 stores the ACLs associated with the DM server B 104*b* from the ACL mod field 424 of FIG. 4 (block 606) to attribute permissions for respective commands to the DM server B 104*b*.

The DM client 106 stores the delegation type information (block 608) from the delegation type field 426 of FIG. 4. In addition, the DM client 106 stores the temporary delegation key and the expiration value (block 610) from the TEMP_DELEGATION_KEY field 428 and the expiration field 430 of FIG. 4. In this manner, the DM client 106 can verify whether a DM server (e.g., the DM server B 104*b*) is authorized to establish a DM control session with it based on the temporary delegation key. If the operations of FIG. 6 were successfully completed (e.g., if the DM client 106 confirmed that the DM server A 104*a* had access permissions to instruct the DM client 106 in this fashion) (block 612), the DM client 106 indicates a successful completion of the operations of FIG. 6 (block 614) in preparation for the DM server A 104*a* to delegate management of the DM client 106 to the DM sever B 104*b*. Otherwise, the example process of FIG. 6 ends without indicating a successful completion (e.g., indicating a failure) of the operations of FIG. 6. In either case, the example process of FIG. 6 ends and control returns to a calling process or function such as the example process of FIG. 5.

Figure 7:
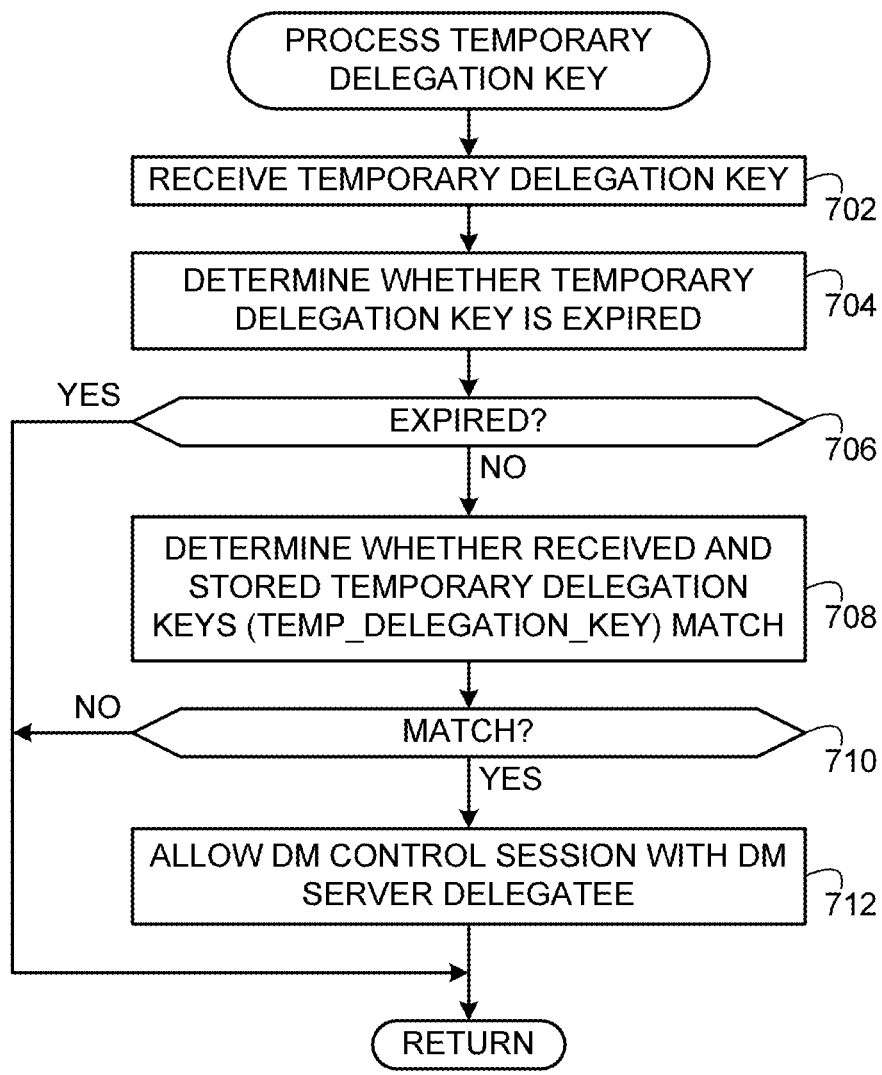
FIG. 7 depicts a flow diagram representative of an example process that may be implemented using computer readable instructions to process a temporary delegation key in a DM client.

FIG. 7 depicts a flow diagram representative of an example process that may be used to process a temporary delegation key in the DM client 106. The example process of FIG. 7 can be used to implement block 522 of FIG. 5B to confirm that the temporary delegation key communicated by the DM server B 104*b* in the TEMP_DELEGATION_KEY field 444 of the initialize DM session signaling [INIT_DM_SESSION] 416 is valid and correct to allow the DM server B 104*b* to establish a DM control session with the DM client 106.

Initially, the DM client 106 receives the temporary delegation key (block 702) from, for example, the TEMP_DELEGATION_KEY field 444 of the initialize DM session signaling [INIT_DM_SESSION] 416. The DM client 106 determines whether the temporary delegation key is expired (block 704). For example, the DM client 106 can refer to the expiration value stored therein at block 610 of FIG. 6 to determine whether the valid duration of the temporary delegation key has not expired. In some example implementations, the DM client 106 can compare the expiration value to a time value of a real-time clock (e.g., the real-time clock 822 of FIG. 8). When the DM client 106 confirms that the temporary delegation key is not expired (block 706), the DM client 106 determines whether the received temporary delegation key matches its stored temporary delegation key (e.g., the temporary delegation key stored at block 610 of FIG. 6) (block 708). When the DM client 106 confirms a match between the received temporary delegation key and the stored temporary delegation key (block 710), the DM client 106 allows establishing a DM control session with the DM server B 104*b* (block 712). However, if the temporary delegation key is expired (block 706) or the received temporary delegation key and the stored temporary delegation key do not match (block 710), the example process of FIG. 7 ends without allowing a DM control session to be established with the DM server B 104*b*. In any case, the example process of FIG. 7 ends and control returns to a calling function or process such as the example process of FIG. 5.

Figure 8:
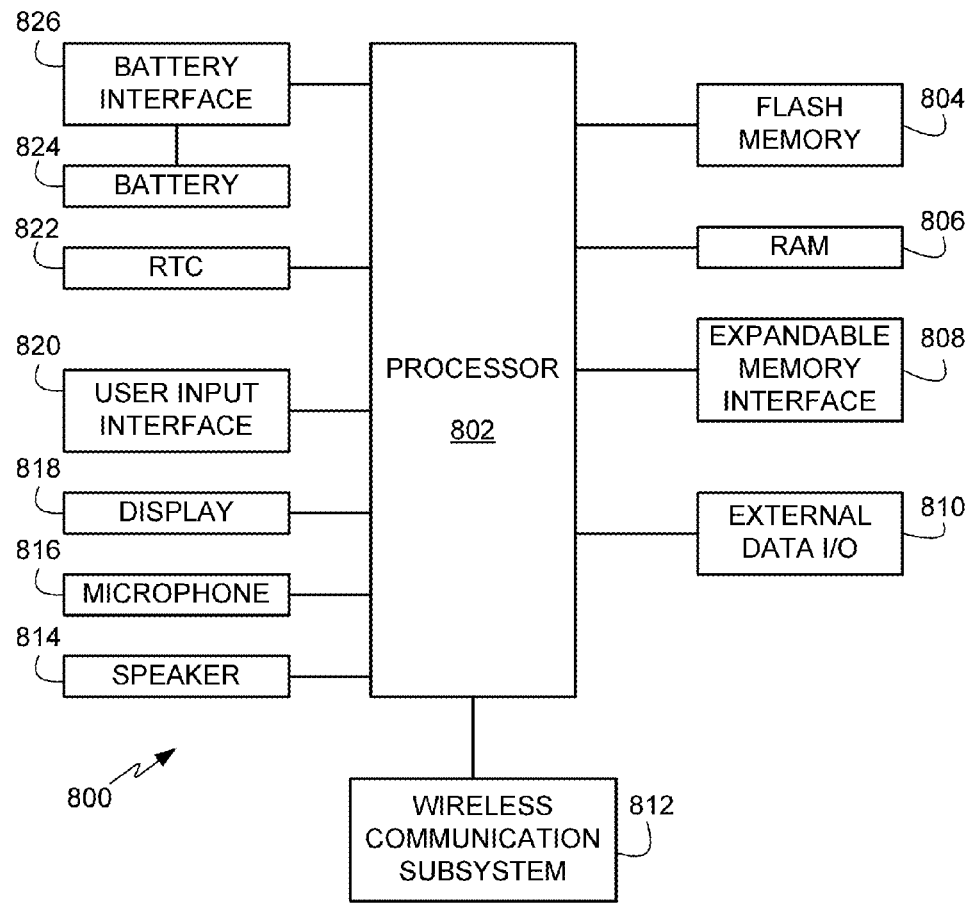
FIG. 8 depicts a block diagram of an example computing device that can be used to implement the example methods and apparatus described herein.

FIG. 8 depicts an example computing device 800. In some instances, the computing device 800 may be adapted and configured as a server device which implements a DM server (e.g., the DM servers 104*a*-*c*). In other instances, the computing device 800 of FIG. 8 may be configured as the mobile device 108 of FIG. 1 which implements a DM client (e.g., the DM client 106). In the illustrated example, the mobile device 800 includes a processor 802 that may be used to control the overall operation of the device 800. The processor 802 may be implemented using a controller, a general purpose processor, a digital signal processor, dedicated hardware, or any combination thereof.

The device 800 is provided with a FLASH memory 804, a random access memory (RAM) 806, and an expandable memory interface 808 communicatively coupled to the processor 802. The FLASH memory 804 can be used to, for example, store computer readable instructions and/or data. In some example implementations, the FLASH memory 804 can be used to store the delegation type data structure 300 of FIG. 3 and computer readable instructions to implement the DM client 106 or a DM server 104*a*-*c* of FIGS. 1, 2, and 4. The RAM 806 can also be used to, for example, store data and/or instructions. The device 800 is also provided with an external data I/O interface 810. The external data I/O interface 810 may be used by a user to transfer information to and from the device 800 through a wired medium.

The device 800 is provided with a communication subsystem 812 to enable communications with networks such as the mobile communication networks 102*a*-*c* of FIG. 1. In the illustrated examples described herein, the communication subsystem 812 can be configured in accordance with a cellular communication standard. In other example implementations, the communication subsystem 812 can be implemented using an IEEE® 802.11 standard, a BLUETOOTH® radio, a ZIGBEE® device, a wireless USB device, or an ultra-wideband (UWB) radio (e.g., WiMax). However, the communication subsystem 812 may also facilitate wired communications between the device 800 and a local area network (LAN) and the like.

To enable a user to use and interact with or via the device 800 when it is configured as the mobile device 108, the device 800 is provided with a speaker 814, a microphone 816, a display 818, and a user input interface 820. The display 830 can be an LCD display, an e-paper display, etc. The user input interface 820 could be an alphanumeric keyboard and/or telephone-type keypad, a multi-direction actuator or roller wheel with dynamic button pressing capability, a touch panel, etc. As discussed above, the example methods and apparatus described herein can also be advantageously used in connection with wireless terminals that do not have user interfaces and, thus, the speaker 814, the microphone 816, the display 818, the user input interface 820, and/or any combination thereof may be optionally omitted.

The device 800 is also provided with a real-time clock (RTC) 822 to track dates and a current time of day and/or to implement time-based and/or date-based operations (e.g., identifying the expiration of temporary delegation key). In the illustrated example, the device 800 is a battery-powered device and is, thus, provided with a battery 824 and a battery interface 826. However, the device 800 may receive voltage and current via another source such as direct current or alternating current power outlets and the like.

International Patent Application No. PCT/US11/29822, filed on Mar. 24, 2011, and U.S. provisional application No. 61/320,125, filed Apr. 1, 2010, are hereby incorporated by reference herein in their entireties.

Although certain methods, apparatus, and articles of manufacture have been described herein, the scope of coverage of this disclosure is not limited thereto. To the contrary, this disclosure covers all methods, apparatus, and articles of manufacture fairly falling within the scope of the claims either literally or under the doctrine of equivalents.

What is claimed is:

1. A network device comprising:
a processor configured to execute an Open Mobile Alliance (OMA) Device Management (DM) server that manages operations of a DM client, the OMA DM server to perform operations of:
participating in mutual authentication with a second OMA DM server;
sending a notification, from the OMA DM server to the second OMA DM server, for notifying the second OMA DM server to proceed with a delegation process, wherein the delegation process switches managing at least one operation of the DM client from the OMA DM server to the second OMA DM server, and the second OMA DM server is different than the OMA DM server;
sending, from the OMA DM server to the DM client, information for modifying an access control list (ACL) to identify the second OMA DM server as managing the at least one operation of the DM client; and
receiving a delegation notification from the second OMA DM server, the delegation notification indicating that the delegation process has been completed.

2. The network device of claim 1 wherein the OMA DM server is to perform a further operation of sending a message to the second OMA DM server, the message initiating the delegation process with the second OMA DM server.

3. The network device of claim 1 wherein the OMA DM server is to perform a further operation of receiving a message from the second OMA DM server, the message initiating the delegation process with the second OMA DM server.

4. The network device of claim 1 wherein the delegation process is specified by a delegation type.

5. The network device of claim 4 wherein the OMA DM server is to perform a further operation of sending the delegation type to the second OMA DM server.

6. The network device of claim 4 wherein the delegation type is one of full delegation or partial delegation, and one of temporary delegation or permanent delegation.

7. A network device comprising:
a processor configured to execute an Open Mobile Alliance (OMA) Device Management (DM) server that manages operations of a DM client, the OMA DM server to perform operations of:
participating in mutual authentication with a second OMA DM server;
receiving a notification from the second OMA DM server for proceeding with a delegation process, wherein the delegation process switches managing at least one operation of the DM client from the second OMA DM server to the OMA DM server and the delegation process includes the second OMA DM server sending information to the DM client for modifying an access control list (ACL) to identify the OMA DM server as managing the at least one operation of the DM client, and wherein the second OMA DM server is different than the OMA DM server;
sending an initialization message to the DM client;
receiving an acknowledgment message from the DM client in response to the initialization message; and
in response to receiving the acknowledgement message from the DM client, sending a delegation notification to the second OMA DM server, the delegation notification indicating that the delegation process has been completed.

8. The network device of claim 7 wherein the OMA DM server is to perform a further operation of receiving a message from the second OMA DM server, the message initiating the delegation process with the second OMA DM server.

9. The network device of claim 7 wherein the OMA DM server is to perform a further operation of sending a message to the second OMA DM server, the message initiating the delegation process with the second OMA DM server.

10. The network device of claim 7 wherein the delegation process is specified by a delegation type.

11. The network device of claim 10 wherein the OMA DM server is to perform a further operation of receiving the delegation type from the second OMA DM server.

12. The network device of claim 10 wherein the delegation type is one of full delegation or partial delegation, and one of temporary delegation or permanent delegation.

13. A mobile device comprising:
a processor configured to execute an Open Mobile Alliance (OMA) Device Management (DM) client, the OMA DM client to perform operations of:
receiving, from a first OMA DM server, information for modifying an access control list (ACL) relative to a delegation process, wherein the delegation process switches managing at least one operation of the OMA DM client from the first OMA DM server to a second OMA DM server, and the second OMA DM server is different than the first OMA DM server;
receiving, from the second DM server, an initialization message; and
sending an acknowledgment message to the second DM server in response to the initialization message, wherein the acknowledgment message triggers the second OMA DM server to send a delegation notification to the first OMA DM server, the delegation notification indicating that the delegation process has been completed.

14. The mobile device of claim 13 wherein the delegation process is specified by a delegation type.

15. The mobile device of claim 14 wherein the delegation type is one of full delegation or partial delegation, and one of temporary delegation or permanent delegation.

* * * * *